July 21, 1936.  L. R. STONE ET AL  2,048,204

NUT MEAT PICKING MACHINE

Filed Dec. 24, 1934  2 Sheets-Sheet 2

INVENTORS
L.R. Stone
E.E. Smith
BY
ATTORNEY

Patented July 21, 1936

2,048,204

UNITED STATES PATENT OFFICE 2,048,204

NUT MEAT PICKING MACHINE

Levi R. Stone, Lodi, and Earl E. Smith, Chico, Calif.; said Smith assignor to said Stone Application December 24, 1934, Serial No. 758,944

3 Claims. (Cl. 209—109)

This invention relates to machines for separating nut meats from the broken shells, and particularly to black or hard shell walnuts.

Owing to the nature of these nuts, the shells must be cracked into a number of relatively small pieces in order to release the meats, which also become inevitably broken up small, and cannot be removed from the shell pieces by ordinary screening operations. Neither can separation be effected by a blowing treatment on account of the fact that even small pieces of the thick shell are apt to be as heavy as meat pieces, and a blast of sufficient strength to carry off the shells would also remove an appreciable percentage of the meats.

It is therefore the principal object of our invention to provide a simple yet highly efficient machine by means of which the nut meats are mechanically separated or picked from the shells. From our experiments with the machines now in operation we have determined that the cost of separating or picking per pound of nut meats is cut to practically one-third of the cost incident to ordinary hand picking methods at present generally employed.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
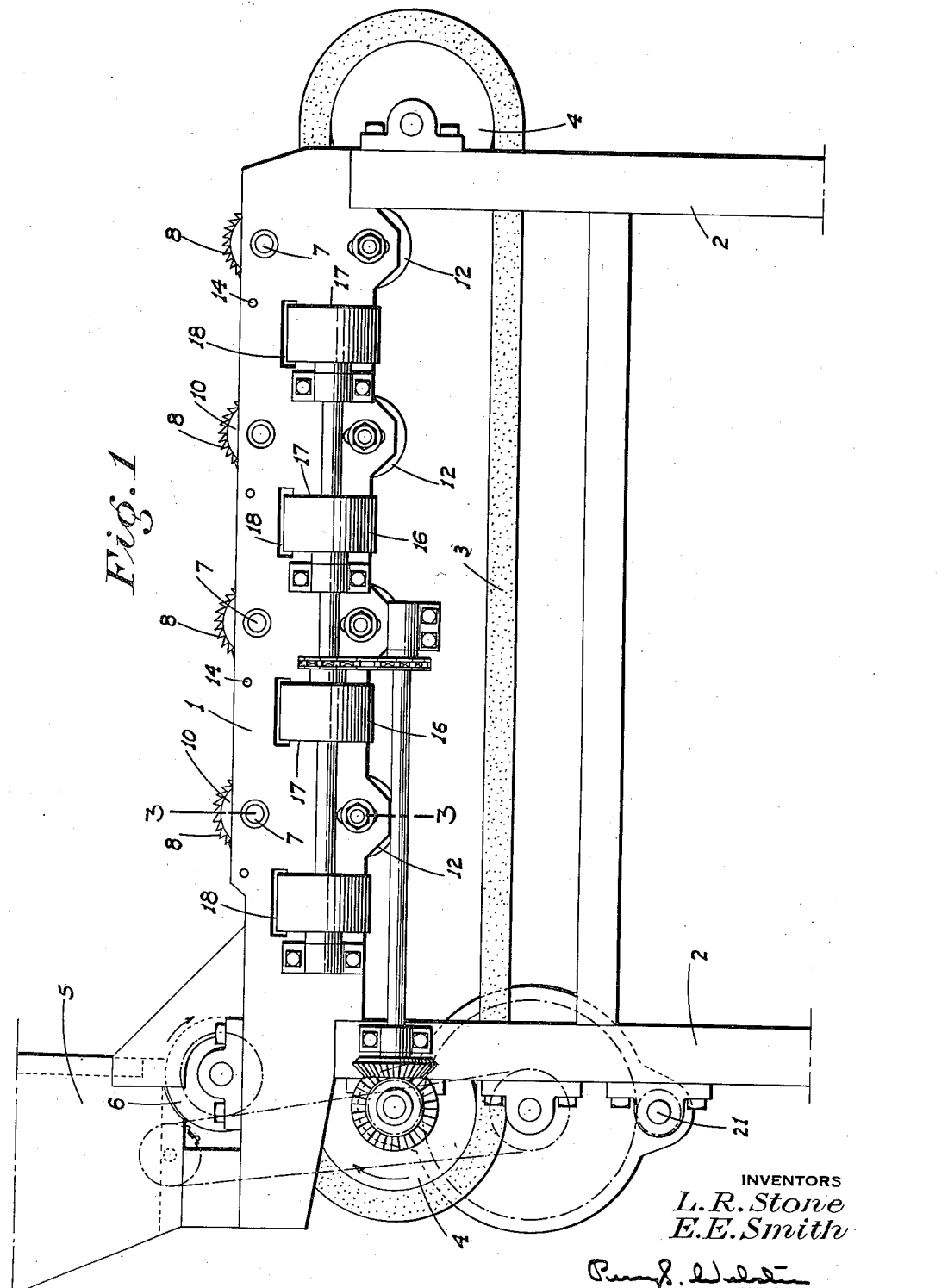
Figure 1 is a side elevation of our improved machine.

Referring now more particularly to the characters of reference on the drawings, the machine comprises spaced side frame beams 1 supported a suitable distance from the floor on legs 2. Running between the beams 1 from end to end and for the full width therebetween is an endless belt 3 supported on pulleys 4, one of which is driven. This belt is of special construction being of thick sponge rubber for the purpose which will be seen later.

A feed hopper 5 for the cracked shells and meats is supported from and above the beams 1 and the upper run of the belt at the head end of the same, the feed from the hopper being controlled by a driven roller 6 which forms the lower part of the outlet of the hopper.

Extending transversely of and above the belt is a row of rotary picking units. Each unit comprises an axial supporting shaft 7 journaled in the beams 1 and on which is mounted a plurality of small closely spaced thin sharp-toothed discs 8. Smooth surfaced spacer discs 9, somewhat smaller in diameter than the toothed discs are disposed therebetween and maintain the same separated. The teeth on the discs 8 are preferably ratchet shape or of similar form to those on rip saws, the radial edges of the teeth being the following edges relative to the direction of rotation of the discs.

Rubber faced rollers 10 are mounted with each unit at its ends, which rollers ride on smooth and relatively hard or firm raised strips 11 extending along the edges of the belt. When the rollers thus frictionally engage the belt strips the periphery of the disc teeth just clears the top of the belt, as shown in Figure 3, and the lowermost teeth then travel in the same direction as the upper surface of the belt. With this arrangement of saw teeth as described, in combination with the yieldable sponge rubber belt thereunder and on which the shells and meats are supported, an efficient picking action is obtained. The shells and meats are constantly moving along the belt past and under the discs. As the downwardly movable teeth encounter any meats in their path such meats are impaled on the teeth and lifted clear of the belt, as indicated at M in Figure 2; the resistance of the meats to being thus impaled being less than the resistance of the belt to being compressed, though the belt may of course yield slightly.

If however pieces of shell are in the path of the teeth, said teeth being incapable of cutting into the shell merely press the same into the belt, as shown at S, and such pieces are carried beyond the discs without being picked up and are finally discharged over the rear end of the belt into any suitable waste chute or receptacle. Any meats which are not picked up by the discs of the unit nearest the hopper pass to the succeeding unit and so on. Thus, by the time the matter on the belt has been acted on by the last unit of the row of pickers, all the meats of any appreciable size have been removed therefrom.

In order to hold the belt in a proper operating position relative to the picking units, and also to alter the relative yieldability of the belt to suit different conditions, we mount vertically adjustable rollers 12 on the beams 1 directly under the different picking units and engage the under surface of the upper run of the belt.

The meats picked up by the teeth of the discs are disengaged therefrom by spring fingers 13 which are disposed between the various discs and which engage and extend at a downward angle from the spacer discs 9 in tangential relation thereto, in the direction of rotation of the upper periphery of the discs. The fingers of each unit are supported on a transverse rod 14 supported from the beams 1 and mounted above the adjacent edge of a transverse trough or channel 15 which extends between and is supported by the beams 1 above the belt 3. In this manner the meats will be disengaged from the teeth by the fingers and will slide down the latter and fall into the trough.

Endless conveyor belts 16, one for each trough, are mounted on pulleys 17 disposed outwardly of the beams 1, one set of such pulleys being driven. The pulleys are disposed so that the upper runs of the belts 16 ride along the bottom of the troughs and extend for the full width thereof. Said upper runs pass through slots 18 in the beams 1, the slots at the forward end of the belts being sufficiently large to provide suitable outlets for the meats carried by the belts. Chutes 19 of suitable form register with the outlet slots 18 and are secured to and project outwardly from the adjacent beam 1 and cooperate with the corresponding pulleys 17 to provide for a controlled downward discharge of the meats from the adjacent end of the belts. Such meats may therefore be delivered into sacks or the like disposed to catch the meats dropping from the belts.

Figure 2:
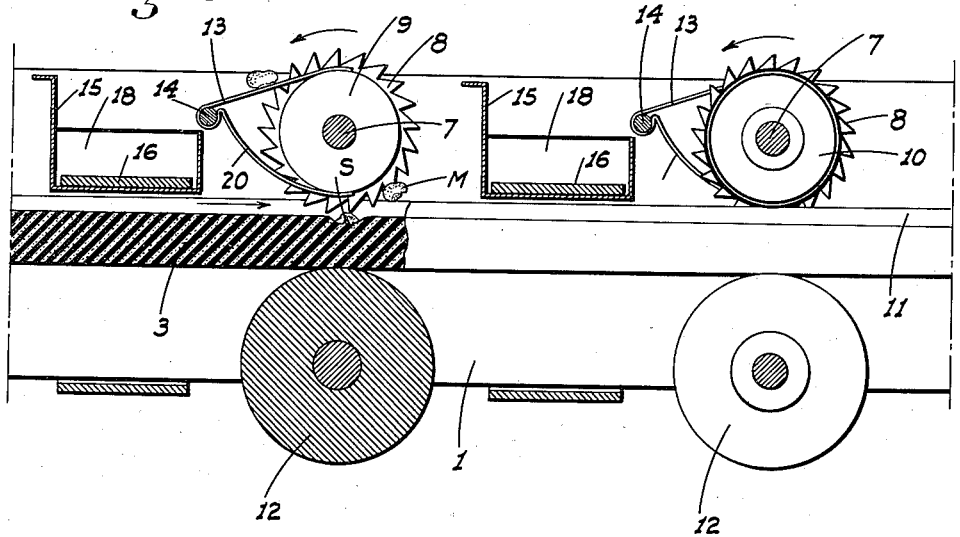
Figure 2 is an enlarged fragmentary longitudinal section of the same.
Figure 3:
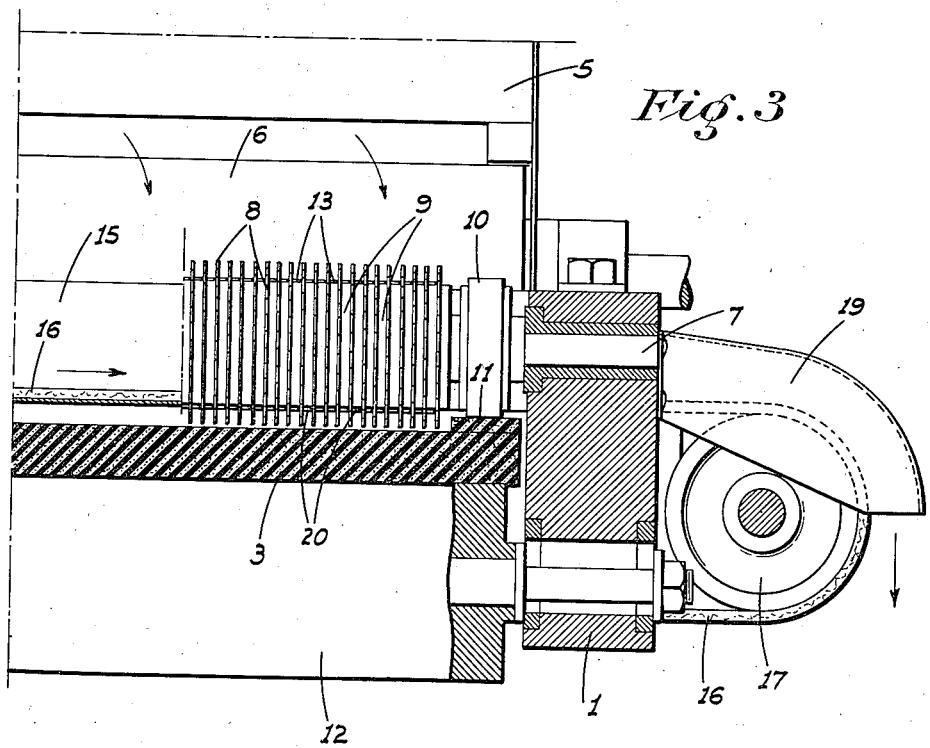
Figure 3 is an enlarged fragmentary transverse section on the line 3—3 of Figure 1.

In order to yieldably hold the fingers against the spacer discs they are preferably formed with downward extensions 20 which engage the under surface of said discs, as shown in Figure 2.

The belts 3 and 16 and the roller 6 are driven at suitable low speeds and in proper coordinated directions from a drive shaft 21, by suitable gearing and other connections therebetween. Inasmuch as said connections or drive mechanisms are capable of considerable rearrangement and of themselves form no part of our invention, it is not deemed necessary to specifically describe the same.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A nut-meat picking machine comprising a conveyor belt on which the meats to be picked are deposited, a rotary picking unit above and extending transversely of the belt, said unit including a plurality of spaced meat impaling elements and relatively small smooth-surfaced spacer discs therebetween, a transverse conveyor above the belt behind the picking unit and on a level below the top of the spacer discs, flat fingers resting on the spacer discs and extending thence downwardly and rearwardly to a termination overhanging the adjacent edge of the transverse conveyor, a transverse shaft on which said fingers are turnably mounted at the rear lower ends, and resilient extensions depending from the shaft engaging end of the fingers and engaging the under side of the spacer discs.

2. In a machine for separating nut meats from shell pieces, a relatively thick cushion belt on which said meats and pieces are deposited, and a series of thin driven discs disposed above the belt with their axes transversely thereof, said discs having sharp pointed and relatively long ratchet teeth about their periphery disposed with their leading edges substantially tangent to a circle concentric with the axis of the discs and with their trailing edges substantially radial of the discs; and with the points of the lowermost teeth adjacent the belt; said discs forming a unit to impale and lift meats from the belt but pressing shell pieces into the belt until said pieces have moved beyond the teeth.

3. In a machine for separating nut meats from shell pieces, a relatively thick cushion belt on which said meats and pieces are deposited, a transversely extending rotary picking unit above the belt, friction rollers on the unit at its ends, relatively non-yielding strips along the edges of the belt in driving contact with the rollers, and a vertically adjustable roller below the belt and engaging the same directly under the unit.

LEVI R. STONE.
EARL E. SMITH.